United States Patent
Koyanagi

(10) Patent No.: US 8,218,521 B2
(45) Date of Patent: Jul. 10, 2012

(54) SIGNAL GENERATION DEVICE AND SIGNAL GENERATION METHOD AND PROGRAM THEREOF IN WIRELESS TRANSMISSION SYSTEM

(75) Inventor: Kenji Koyanagi, Minato-ku (JP)

(73) Assignee: NEC Corporation, Tokyo (JP)

( * ) Notice: Subject to any disclaimer, the term of this patent is extended or adjusted under 35 U.S.C. 154(b) by 536 days.

(21) Appl. No.: 12/445,683

(22) PCT Filed: Oct. 18, 2007

(86) PCT No.: PCT/JP2007/070364
§ 371 (c)(1),
(2), (4) Date: Apr. 15, 2009

(87) PCT Pub. No.: WO2008/047874
PCT Pub. Date: Apr. 24, 2008

(65) Prior Publication Data
US 2010/0316041 A1 Dec. 16, 2010

(30) Foreign Application Priority Data
Oct. 19, 2006 (JP) .................................. 2006-285030

(51) Int. Cl.
*H04B 7/208* (2006.01)
*H04B 7/00* (2006.01)
*H04J 11/00* (2006.01)
*H04L 27/28* (2006.01)

(52) U.S. Cl. ........ 370/344; 370/208; 370/210; 370/310; 455/522; 375/260

(58) Field of Classification Search .......... 370/203–535; 375/141, 148, 219, 230, 260, E1.002; 455/73, 455/102, 120, 125, 127.1, 403, 522, 560, 455/561, 562.1
See application file for complete search history.

(56) References Cited

U.S. PATENT DOCUMENTS
6,690,747 B2 * 2/2004 Petrus et al. .................. 375/324
(Continued)

FOREIGN PATENT DOCUMENTS
JP 2005-137014 A 5/2005
(Continued)

OTHER PUBLICATIONS
Motorola, "PA power de-rating reduction scheme for DFT-SOFDM and TP", R1-060392, TSG-RAN WG1 #44, Denver, USA, Feb. 13-17, 2006, pp. 1-7.
(Continued)

*Primary Examiner* — Afsar M. Qureshi
(74) *Attorney, Agent, or Firm* — Sughrue Mion, PLLC

(57) ABSTRACT

In a signal generation device in a wires transmission system, a calculation amount is greatly reduced compared with a convention FFT Pre-Processing method which performs oversampling, and peak power is reduced to substantially the same extent as in the convention method. A transmitter 100 includes a slope estimation unit 102 and a slope reference attenuation signal selection unit 103. The slope estimation unit 102 generates and outputs a slope estimation value indicating an inclination of a data signal waveform at a data signal point. The slope reference attenuation signal selection unit 103 estimates a data signal which may cause a peak after oversampling, based on an amplitude value of a data signal and a slope estimation value, and determines an attenuation amount for a selected data signal. The slope reference attenuation signal selection unit 103 generates information concerning a selection result and the determined attenuation amount, and outputs the information as a data attenuation coefficient.

17 Claims, 10 Drawing Sheets

U.S. PATENT DOCUMENTS

| | | | |
|---|---|---|---|
| 2003/0202460 A1* | 10/2003 | Jung et al. | 370/208 |
| 2003/0231581 A1 | 12/2003 | Son | |
| 2006/0262871 A1 | 11/2006 | Cho et al. | |
| 2007/0047431 A1* | 3/2007 | Nishio et al. | 370/203 |
| 2007/0089015 A1 | 4/2007 | Saul | |
| 2008/0085693 A1* | 4/2008 | Harms | 455/255 |
| 2009/0135803 A1* | 5/2009 | Luo et al. | 370/350 |

FOREIGN PATENT DOCUMENTS

| | | |
|---|---|---|
| JP | 2005-277565 A | 10/2005 |
| JP | 2005-294996 A1 | 10/2005 |
| JP | 2006-108817 A | 4/2006 |
| JP | 2006-166436 A | 6/2006 |
| JP | 2006-314110 A | 11/2006 |
| WO | 03-063398 A1 | 7/2003 |
| WO | 2005-096580 A1 | 10/2005 |
| WO | 2007-036978 A1 | 4/2007 |

OTHER PUBLICATIONS

Kenji Koyanagi, et al., "FFT Preprocessing o Mochiita PAPR Teigenho ni okeru Enzanryo Sakugen", Proceedings of the 2007 IEICE General Conference, Tsushin 1, The Institute of Electronics, Information and Communication Engineers, Mar. 2007, p. 508.

* cited by examiner

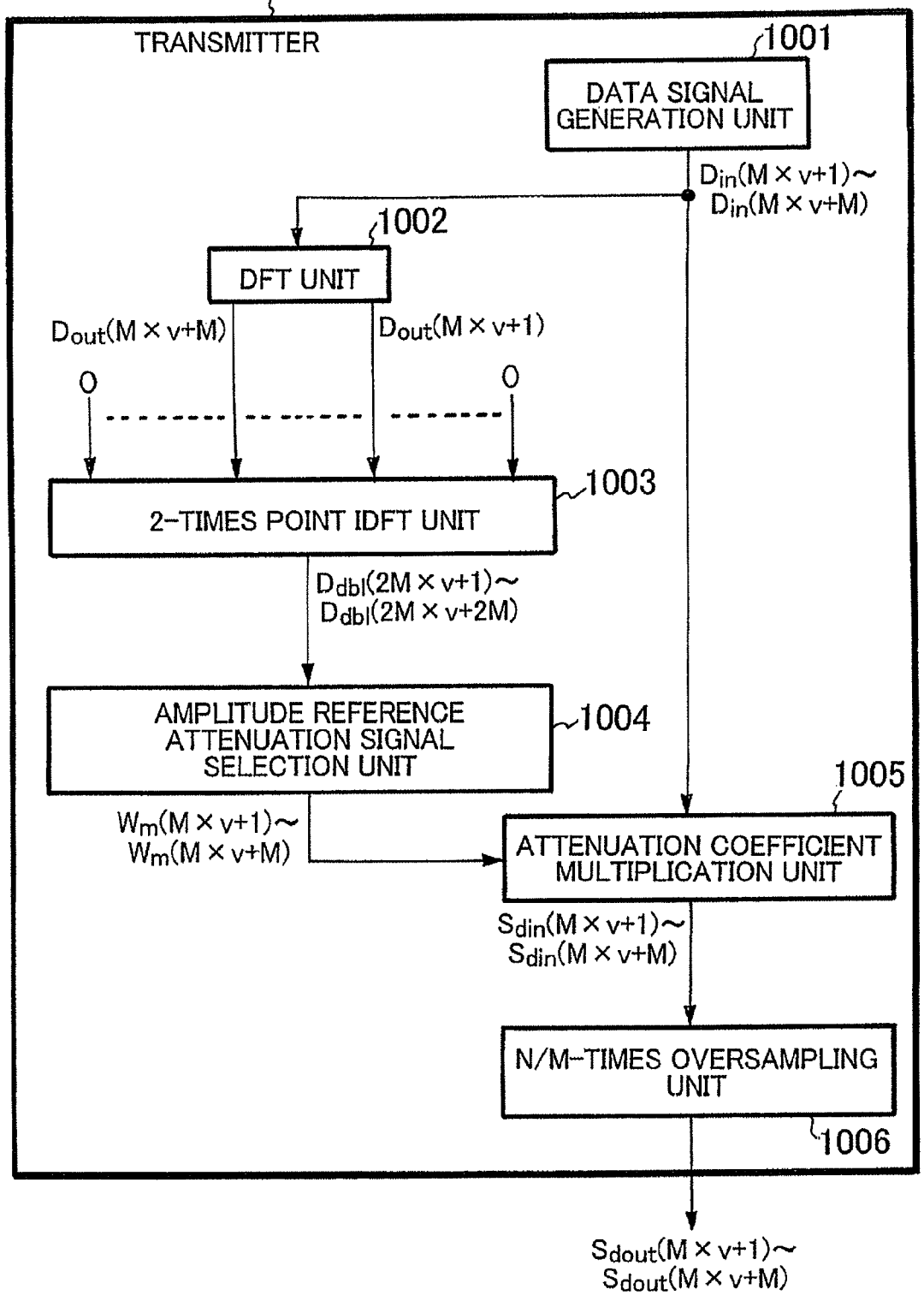

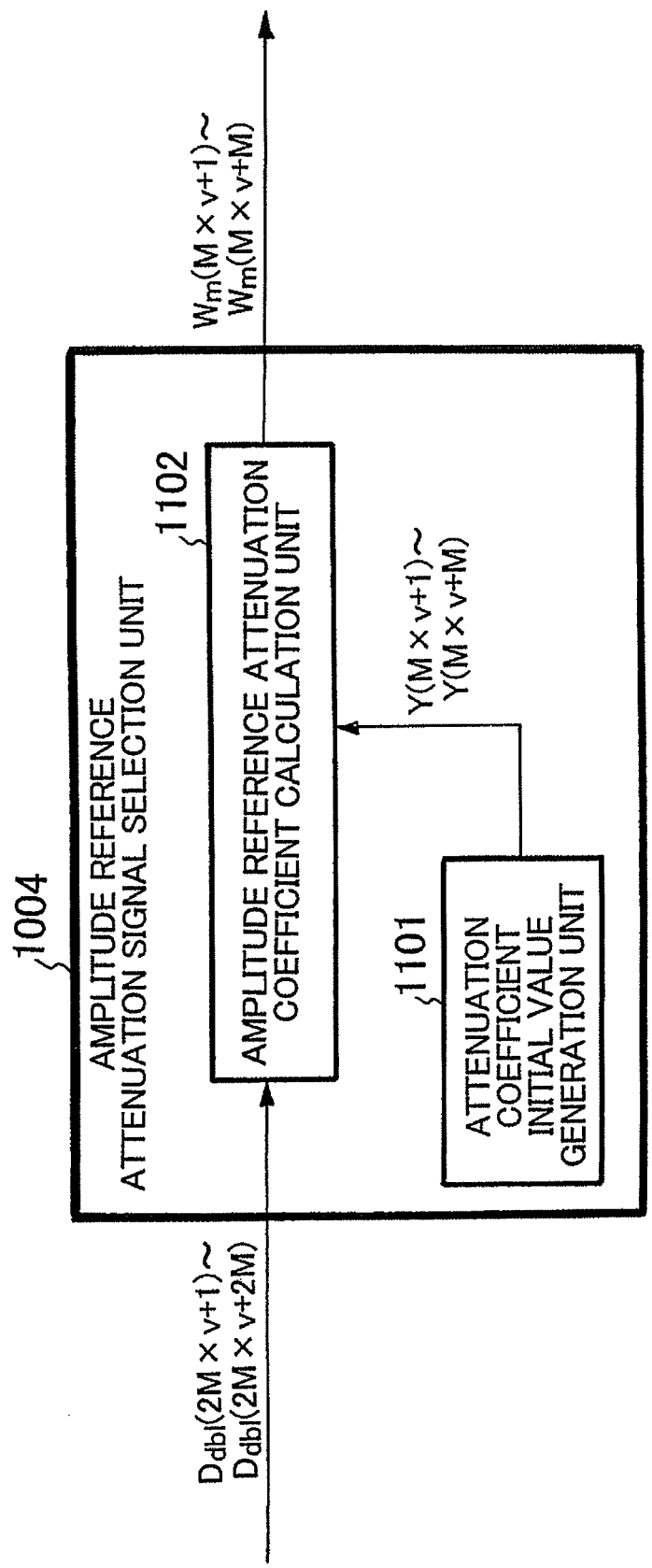

FIG.3

EQUATION 1:
$$Y(M \times v + g) = (C / abs(D_{dbl}(2M \times v + 2g - 1)))^\gamma$$

EQUATION 2:
$$U_{sl}(M \times v + i)_{real} = \frac{-2}{\sqrt{M}} \sum_{r=1}^{M} \left[ D_{out}(M \times v + r)_{real} \times \frac{2\pi(r - \frac{M}{2})}{M} \sin(2\pi(r - \frac{M}{2})i/M) + D_{out}(M \times v + r)_{imag} \times \frac{2\pi(r - \frac{M}{2})}{M} \cos(2\pi(r - \frac{M}{2})i/M) \right]$$

EQUATION 3:
$$U_{sl}(M \times v + i)_{imag} = \frac{-2}{\sqrt{M}} \sum_{r=1}^{M} \left[ D_{out}(M \times v + r)_{real} \times \frac{2\pi(r - \frac{M}{2})}{M} \cos(2\pi(r - \frac{M}{2})i/M) - D_{out}(M \times v + r)_{imag} \times \frac{2\pi(r - \frac{M}{2})}{M} \sin(2\pi(r - \frac{M}{2})i/M) \right]$$

EQUATION 4:
$$Y(M \times v + h) = (A / abs(D_{in}(M \times v + h)))^\alpha \times (B / abs(U_{sl}(M \times v + k)))^\beta$$

EQUATION 5:
$$U_{ov}(Z \times v + q)_{real} = \frac{-2}{\sqrt{Z}} \sum_{x=1}^{Z} \left[ D_{ovin}(Z \times v + x)_{real} \times \frac{2\pi(x - \frac{Z}{2})}{Z} \sin(2\pi(x - \frac{Z}{2})w/Z) + D_{ovin}(Z \times v + x)_{imag} \times \frac{2\pi(x - \frac{Z}{2})}{Z} \cos(2\pi(x - \frac{Z}{2})w/Z) \right]$$

EQUATION 6:
$$U_{ov}(Z \times v + q)_{imag} = \frac{-2}{\sqrt{Z}} \sum_{x=1}^{Z} \left[ D_{ovin}(Z \times v + x)_{real} \times \frac{2\pi(x - \frac{Z}{2})}{Z} \cos(2\pi(x - \frac{Z}{2})w/Z) - D_{ovin}(Z \times v + x)_{imag} \times \frac{2\pi(x - \frac{Z}{2})}{Z} \sin(2\pi(x - \frac{Z}{2})w/Z) \right]$$

SIGNAL GENERATION DEVICE AND SIGNAL GENERATION METHOD AND PROGRAM THEREOF IN WIRELESS TRANSMISSION SYSTEM

TECHNICAL FIELD

The present invention is based on Japanese Patent Application No. 2006-285030 (filed Oct. 19, 2006), and claims priority based on the same application No. 2006-285030 under Paris Convention. Content of disclosure of the application No. 2006-285030 is incorporated into the description of the present application by reference to the application No. 2006-285030.

The present invention relates to a signal generation device suitably applied to a transmission device in a wireless transmission system.

BACKGROUND ART

In recent years, SC (Single Carrier)-FDMA (Frequency Division Multiple Access) scheme has achieved lower peak power than multi-carrier transmission schemes such as OFDM (Orthogonal Frequency Division Multiplexing) and can reduce power consumption. Therefore, much attention has been drawn to the SC-FDMA scheme. One of generation methods for generating SC-FDMA transmission signals is as follows. For each of unit time slots, M data symbols (where M is a natural number) are subjected to DFT (Discrete Fourier Transform), thereby converting the M data symbols into a frequency domain. Total N−M zeros (where N is a multiplier of 2, and is greater than M) are further inserted in both of high and low frequency sides. IFFT sampling at N points (corresponding to N/M-times oversampling) is thereafter carried out. Even after the N/M-times oversampling, Peak to Averaged Power Ratio (PAPR) is lower than that in the multi-carrier transmission methods. However, one of problems in the SC-FDMA is that the PAPR increases to be greater as compared with that before the N/M-times oversampling.

FFT Pre-processing method is one of methods for reducing the PAPR in the SC-FDMA scheme (e.g., see Non-Patent Document 1). According to the FFT Pre-processing method, X-times oversampling is performed before N/M-times oversampling which is performed when generating a transmission signal. The X-times oversampling is performed to select a data symbol which may cause a peak in the N/M-times oversampling. In this processing of selection, data symbol points are associated with signal points obtained by different operations of X-times oversampling, respectively, to determine whether each data symbol may cause a peak. Therefore, X needs to be 2 or greater (where X is a real number not smaller than 2). Further, oversampling rates of X and N/M should desirably be values close to each other in order to maximize effect of the FFT Pre-processing method. A conventional example will now be described below in a case of X=2 (N/M=1.7) where M=300 and N=512 are given.

A signal which may cause a great peak after N/M-times (1.7 times) oversampling is selected before the oversampling by using a result of 2-times oversampling. The amplitude of the selected signal is attenuated before DFT in the 1.7-times oversampling. In this manner, a high peak is prevented from occurring after the 1.7-times oversampling, which is a feature of this conventional example. A conventional FFT Pre-processing method will further be described below with reference to FIGS. 1 and 2.

A transmitter 1000 shown in FIG. 1 includes a data signal generation unit 1001, a DFT unit 1002, a 2-times point IDFT unit 1003, an amplitude reference attenuation signal selection unit 1004, a subtraction coefficient multiplication unit 1005, an N/M-times oversampling unit 1006.

In the transmitter 1000 shown in FIG. 1, where M data signals (M is a natural number) are included in each unit time slot, the data signal generation unit 1001 generates M data signals $Din(M \times v+1)$ to $Din(M \times v+M)$ (consecutive numbers from the first data in the first slot), in the with time slot (v is an integer not smaller than 0). The DFT unit 1002 is supplied with the data signals $Din(M \times v+1)$ to $Din(M \times v+M)$, performs DFT (Discrete Fourier Transform) at M points, and outputs DFT output signals $Dout(M \times v+1)$ to $Dout(M \times v+M)$.

The 2-times point IDFT unit 1003 is supplied with total 2M signals which are obtained by extrapolating total M zero-components from outsides of both ends of the DFT output signals, where the two ends correspond to high and low frequency components. The 2-times point IDFT unit 1003 generates 2-times oversampling signals by performing IDFT (Inverse Discrete Fourier Transform) at 2M points, and outputs the generated signals as 2-times oversampling signals $Ddbl(2M \times v+1)$ to $Ddbl(2M \times v+2M)$.

Referring to FIG. 2, the amplitude reference attenuation signal selection unit 1004 will now be described next. The amplitude reference attenuation signal selection unit 1004 includes an attenuation coefficient initial value generation unit 1101 and an amplitude reference attenuation coefficient calculation unit 1102.

The attenuation coefficient initial value generation unit 1101 generates and outputs attenuation coefficient initial values $Y(M \times v+1)$ to $Y(M \times v+M)$ which are all 1.

The amplitude reference attenuation coefficient calculation unit 1102 is supplied with the 2-times oversampling signals $Ddbl(2M \times v+1)$ to $Ddbl(2M \times v+2M)$ and the attenuation coefficient initial values $Y(M \times v+1)$ to $Y(M \times v+M)$. If the magnitude of a 2-times oversampling signal which is not at the same sampling time as the data signal before the oversampling exceeds a threshold C (C is a positive real number), then the attenuation coefficient initial value $Y(M \times v+g)$ (g is a natural number not greater than M) corresponding to a sampling time which is prior to the sampling time of the oversampling signal by one 2-times sampling time is changed to the resultant value expression 1 in FIG. 3 by the amplitude reference attenuation coefficient calculation unit 1102. The amplitude reference attenuation coefficient calculation unit 1102 outputs, as attenuation coefficients $Wm(M \times v+1)$ to $Wm(M \times v+M)$, results of changing the attenuation coefficient initial values $Y(M \times v+1)$ to $Y(M \times v+M)$. In the expression 1, y is a positive real number and abs( ) is a magnitude of the number in the parenthesis.

A result of N/M-times oversampling after attenuation coefficient multiplication can be set to a value close to a constant value (C) by setting an attenuation coefficient so as to decrease as the amplitude value of a 2-times oversampling signal $Ddbl(2M \times v+2g-1)$ increases. Since sizes of peaks after N/M-times oversampling depend on the attenuation coefficient, the attenuation coefficient should desirably be smaller in order to reduce PAPR. However, if the amplitude after multiplication of the attenuation coefficient is too small, there is a problem that reception characteristics deteriorate. Therefore, when the amplitude of the 2-times oversampling signal $Ddbl(2M \times v+2g-1)$ is small, the attenuation coefficient needs to be large.

The attenuation coefficient multiplication unit 1005 is supplied with the data signals $Din(M \times v+1)$ to $Din(M \times v+M)$ and the attenuation coefficients $Wm(M \times v+1)$ to $Wm(M \times v+M)$, and multiplies the data signals $Din(M \times v+1)$ to $Din(M \times v+M)$ respectively by the attenuation coefficients $Wm(M \times v+1)$ to Wm(M×v+M). The attenuation coefficient multiplication unit 1005 outputs multiplication results thereof as attenuation coefficient multiplication signals Sdin(M×v+1) to Sdin(M×v+M).

The N/M-times oversampling unit 1006 is supplied with the attenuation coefficient multiplication signals Sdin(M×v+1) to Sdin(M×v+M), and performs DFT at M points, thereby generating attenuation multiplication DFT output signals Sziout(M×v+1) to Sziout(M×v+M). The N/M-times oversampling unit 1006 extrapolates (N−M) zero signal points from outsides of both ends of high and lower frequency components of the attenuation multiplication DFT output signals Sziout(M×v+1) to Sziout(M×v+M) in order to obtain N points, where N is a multiplier of 2 and is greater than M, and the unit 1006 performs IFFt (Inverse Fast Fourier Transform) on the N points, and the unit 1006 performs N/M oversampling in order to obtain transmission signals Sdout(M×v+1) to Sdout(M×v+M).

PAPR after N/M-times oversampling can thus be reduced in a manner that signals which may cause high peaks after N/M-times oversampling are selected by performing 2-times oversampling and are further attenuated before DFT in N/M-times oversampling.

Non-Patent Document 1: PA power de-rating reduction scheme for DFT-SOFDM and TP, R1-060392, Motorola, 3GPP TSG-RAN WG1 #44, Denver, USA, Feb. 13-17, 2006

SUMMARY OF INVENTION

However, such a conventional method requires IDFT at 2M points because data signals which may cause a peak beyond a threshold C after N/M-times oversampling are selected by performing 2-times oversampling. IDFT at 2M points is equivalent to approximately four times greater calculation amount than DFT at M points, and causes a problem of a calculation amount. Input signals to DFT which may cause a peak need to be selected while greatly reducing the calculation amount, compared with IDFT at 2M points.

The present invention hence has an object of providing a signal generation device, a signal generation method, and a computer-readable medium thereof for use in a wireless transmission system, which can greatly reduce a calculation amount in comparison with a conventional FFT Pre-Processing method of performing oversampling, and can reduce PAPR to the same extent as in the conventional method.

A signal generation device that generates a transmission signal in a wireless transmission system, including: a data attenuation coefficient generation means that is supplied with M data signals (M is a natural number), for estimating and selecting data signals that may cause a peak after oversampling, determining an attenuation amount for the selected one or more data signals, generating information concerning a selection result and the determined attenuation amount for the selection result, and outputting the information as a data attenuation coefficient; an attenuation coefficient multiplication means that is supplied with the M data signals and the data attenuation coefficient, for multiplying each of the data signals corresponding to the selection result for the data attenuation coefficient by the attenuation amount for the selection result, and outputting multiplication results as M attenuation coefficient multiplication signals; and an oversampling unit that is input with the M attenuation coefficient multiplication signals and performs oversampling, thereby generating and outputting a transmission signal, wherein the data attenuation coefficient generation means includes a slope estimation unit that outputs, as slope estimation values corresponding respectively to the M data signals, information indicating inclinations of data signal waveforms at data signal points, from the M data signals, respectively, and a slope reference attenuation signal selection unit that is supplied with the M data signals and the M slope estimation values, estimates and selects data signals that may cause a peak after oversampling, based on amplitude values of the M data signals and the M slope estimation values, determines an attenuation amount for the selected data signals, generates information concerning a selection result and the determined attenuation amount, and outputs the information as the data attenuation coefficient.

According to the present invention, a data signal to be multiplied by an attenuation coefficient is selected by using an inclination of a data signal waveform. Therefore, a transmission signal can be generated with peak power of the transmission signal reduced to the same extent as in convention methods and with a calculation amount smaller than in convention methods.

BRIEF DESCRIPTION OF DRAWINGS

FIG. 1 is a block diagram of a transmitter of a conventional example;

FIG. 2 is a block diagram of an amplitude reference attenuation signal selection unit in the conventional example;

FIG. 3 shows mathematical expressions;

EXPLANATION OF REFERENCE SYMBOLS

Figure 4:
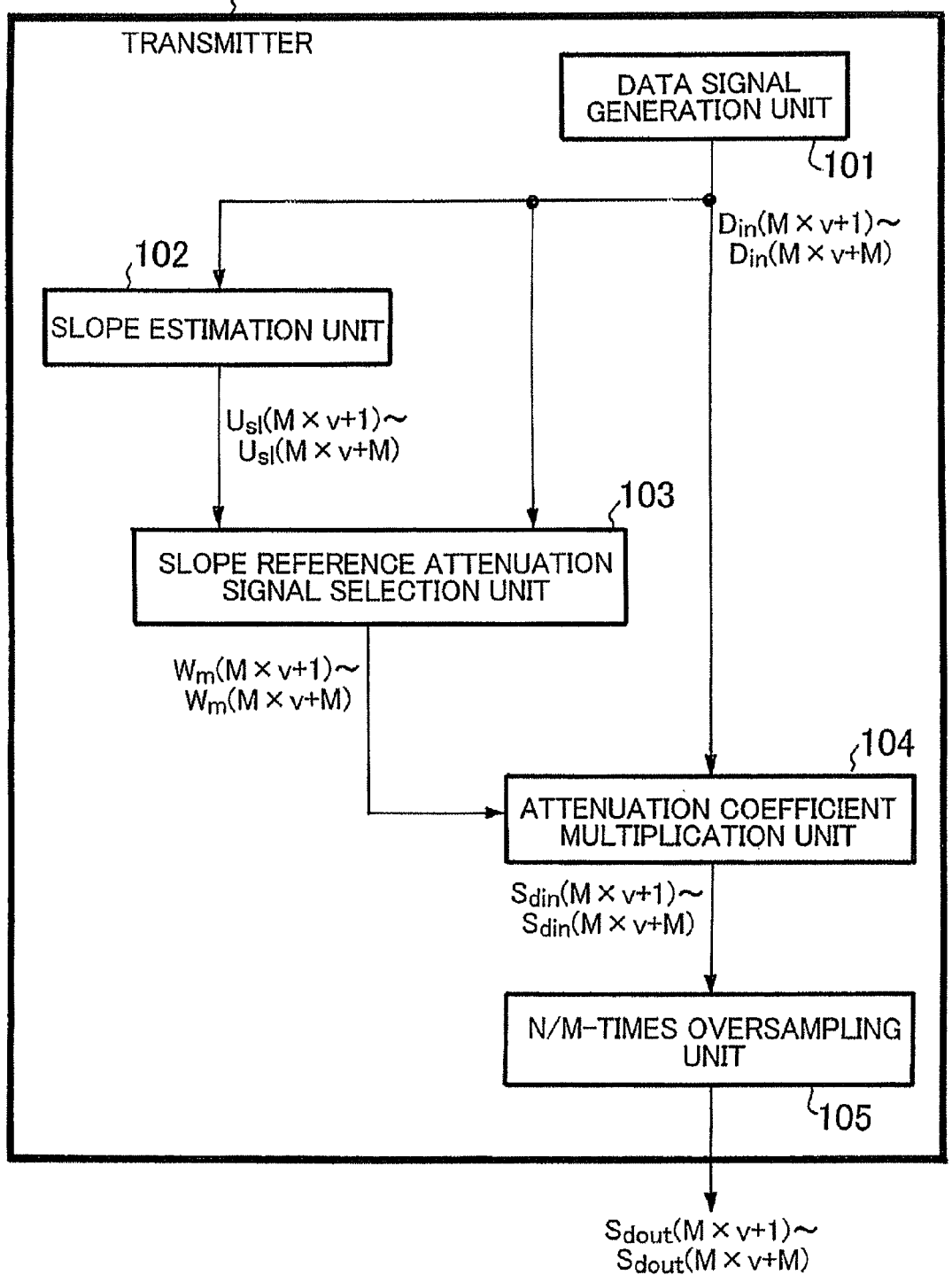
FIG. 4 is a block diagram of a transmitter according to the present invention.

100, 1000: Transmitter
101, 1001: Data signal generation unit
102: Slope estimation unit
103: Slope reference attenuation signal selection unit
104, 1005: Attenuation coefficient multiplication unit
105, 1006: N/M-times oversampling unit
201, 401, 1002: DFT unit
202: M point IDFT partial differential value calculation unit
301, 1101: Attenuation coefficient initial value generation unit
302: Attenuation coefficient calculation unit
402, 603: Z point IDFT partial differential value calculation unit
403: Peak estimation slope approximation unit
601: Cyclic shift signal insertion unit
602: FFT unit
604: Cyclic shift signal deletion unit
701: I/Q separation unit 702, 703: Constant multiplication unit
704: I/Q multiplexing unit 705: IFFT unit
1003: 2-times point IDFT unit
1004: Amplitude reference attenuation signal selection unit
1102: Amplitude reference attenuation signal selection unit

DESCRIPTION OF EMBODIMENTS

Hereinafter, a best mode for carrying out the invention will be described with reference to the drawings.

FIG. 4 is a block diagram showing a transmitter according to the best mode of the invention. The transmitter 100 includes a data signal generation unit 101, a slope estimation unit 102, a slope reference attenuation signal selection unit 103, an attenuation coefficient multiplication unit 104, and an N/M-times oversampling unit 105. The transmitter 100 executes functions described below, under program control.

In the transmitter 100 shown in FIG. 4, the data signal generation unit 101 generates M data signals $Din(M \times v+1)$ to $Din(M \times v+M)$ (where M is a natural number) in a v-th time slot (where v is an integer not smaller than 0).

Figure 5:
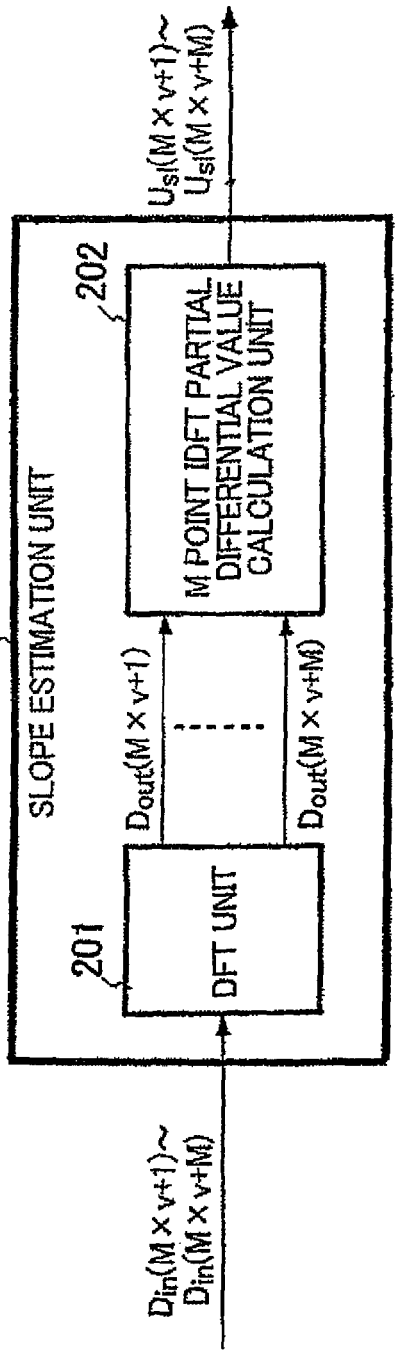
FIG. 5 is a block diagram of a slope estimation unit in the best mode for carrying out the invention.

Next, the slope estimation unit 102 will be described with reference to FIG. 5. The slope estimation unit 102 includes a DFT unit 201 and an M point IDFT partial differential value calculation unit 202. The DFT unit 201 is supplied with the data signals $Din(M \times v+1)$ to $Din(M \times v+M)$, performs DFT at M points, and generates and outputs DFT output signals $Dout(M \times v+1)$ to $Dout(M \times v+M)$.

The M point IDFT partial differential value calculation unit 202 calculates an inclinations of each of data signal waveforms of the data signals $Din(M \times v+1)$ to $Din(M \times v+M)$ at sampling time, from expressions 2 and 3 shown in FIG. 3 which are obtained by performing partial differentiation with respect to time on each of real and imaginary components of a calculation expression of IDFT. The M point IDFT partial differential value calculation unit 202 outputs the inclination as a slope estimation value $Usl(M \times v+i)$ (i is a natural number not greater than M). In the expressions 2 and 3, ( )real denotes a real number part of the number in the parenthesis, and ( )imag denotes an imaginary number part of the number in the parenthesis.

Figure 6:
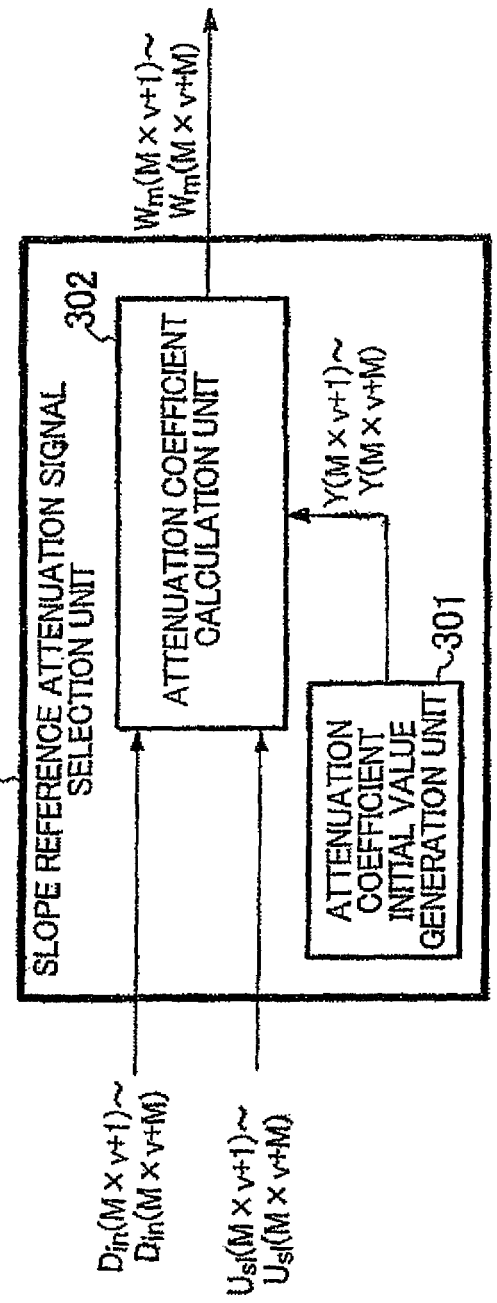
FIG. 6 is a block diagram of a slope reference attenuation signal selection unit according to the invention.

Next, the slope reference attenuation signal selection unit 103 will be described with reference to FIG. 6. The slope reference attenuation signal selection unit 103 includes an attenuation coefficient initial value generation unit 301 and an attenuation coefficient calculation unit 302.

The attenuation coefficient initial value generation unit 301 generates and outputs attenuation coefficient initial values $Y(M \times v+1)$ to $Y(M \times v+M)$ which are all 1.

The attenuation coefficient calculation unit 302 is supplied with slope estimation value $Usl(M \times v+1)$ to $Usl(M \times v+M)$, the data signals $Din(M \times v+1)$ to $Din(M \times v+M)$, and the attenuation coefficient initial values $Y(M \times v+1)$ to $Y(M \times v+M)$. The attenuation coefficient initial value generation unit 301 performs the following. If all the amplitudes of p+1 successive data signals $Din(M \times v+j)$ to $Din(M \times v+j+p)$ (where p is a natural number) are not less than an amplitude threshold A (where A is a positive real number) or not greater than $-A$, then the p+1 successive data signals $Din(M \times v+j)$ to $Din(M \times v+j+p)$ are selected. Then, if all the magnitudes of slope estimation values $Usl(M \times v+j)$ to $Usl(M \times v+j+p-1)$ corresponding to data signals $Din(M \times v+j)$ to $Din(M \times v+j+p-1)$ exceed a slope threshold B (where B is a positive real number) and the sign of the data signal $Din(M \times v+k$ (where k is an integer between j and (j+p−1)) is the same as the sign of slope estimation value $Usl(M \times v+k)$, then an attenuation coefficient initial value $Y(M \times v+h)$ corresponding to $Din(M \times v+k)$ and $Din(M \times v+k+1)$ are changed to values calculated from the expression 4 shown in FIG. 3. The attenuation coefficient calculation unit 302 outputs results of changing the attenuation coefficient initial values $Y(M \times v+1)$ to $Y(M \times v+M)$, as attenuation coefficients $Wm(M \times v+1)$ to $Wm(M \times v+M)$. In the expression 4, α and β are positive real numbers.

If the attenuation coefficients $WM(M \times v+1)$ to $Wm(M \times v+M)$ are set to small values in accordance with sizes of data signals and slope estimation values, peaks in results of performing N/M-times oversampling after the attenuation coefficient multiplication can be set to values which are close to a constant value (A). Like in conventional methods, sizes of peaks after N/M-times oversampling depend on the attenuation coefficient Wm, and therefore, the attenuation coefficient Wm should desirably be small in order to reduce PAPR. However, if the attenuation coefficient is too small, there is a problem that reception characteristics deteriorate. Therefore, the attenuation coefficient should desirably be changed in accordance with amplitude values of data signals and/or sizes of slope estimation values.

The attenuation coefficient multiplication unit 104 is supplied with the data signals $Din(M \times v+1)$ to $Din(M \times v+M)$ and the attenuation coefficients $Wm(M \times v+1)$ to $Wm(M \times v+M)$, and multiplies the data signals $Din(M \times v+1)$ to $Din(M \times v+M)$ by the attenuation coefficients $Wm(M \times v+1)$ to $Wm(M \times v+M)$, respectively, to output attenuation coefficient multiplication signals $Sdin(M \times v+1)$ to $Sdin(M \times v+M)$.

The N/M-times oversampling unit 105 is supplied with the attenuation coefficient multiplication signals $Sdin(M \times v+1)$ to $Sdin(M \times v+M)$, and performs DFT at M points, thereby generating attenuation multiplication DFT output signals $Sziout(M \times v+1)$ to $Sziout(M \times v+M)$. The N/M-times oversampling unit 105 extrapolates (N−M) zero signal points from outsides of both ends of high and lower frequency components of the attenuation multiplication of DFT output signals $Sziout(M \times v+1)$ to $Sziout(M \times v+M)$ in order to obtain N points, where N is a multiplier of 2 and is greater than M, and the unit 1006 performs IFFT (Inverse Fast Fourier Transform) on the N points, and the unit 1006 performs N/M oversampling in order to obtain transmission signals $Sdout(M \times v+1)$ to $Sdout(M \times v+M)$.

Through processings as described above, data signals to be multiplied by attenuation coefficients are selected by use of inclinations of waveforms of data signals. In this manner, transmission signals can be generated with a smaller calculation amount than in conventional methods and with PAPR reduced to the same extent as in conventional methods.

First Embodiment

Figure 7:
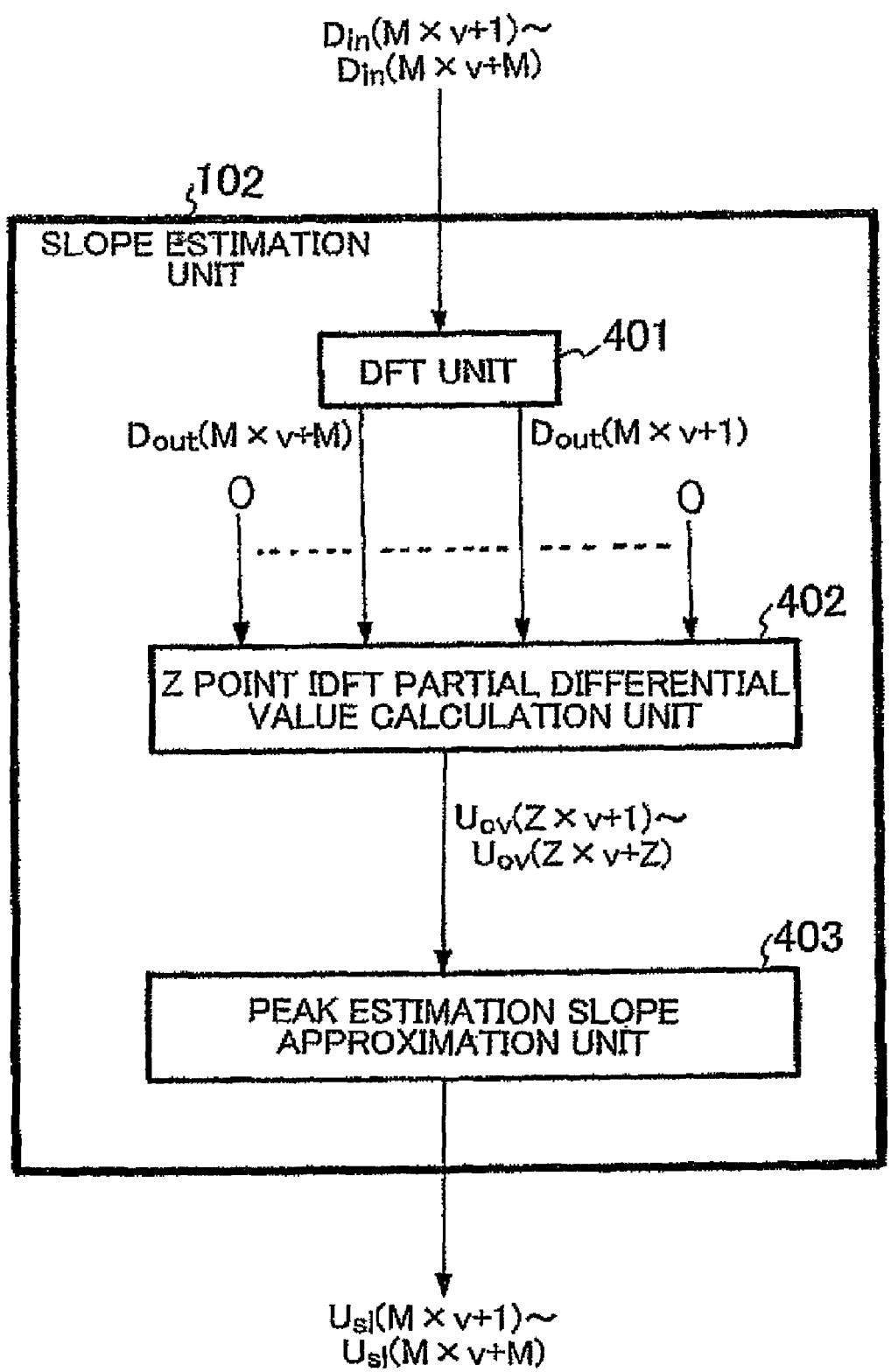
FIG. 7 is a block diagram of a slope estimation unit in a first embodiment.

Next, a first embodiment will be described. The same block diagram as that of the transmitter in the best mode of the invention can also be referred to as a block diagram of a transmitter according to the first embodiment. The first embodiment differs from the best mode of the invention in the processing performed by the slope estimation unit 102. In this embodiment, a slope estimation unit which is the difference to the best mode of the invention will be described with reference to FIG. 7. The slope estimation unit 102 includes a DFT unit 401, a Z point IDFT partial differential value calculation unit 402 (where Z is a multiplier of 2 which is greater than N), and a peak estimation slope approximation unit 403. The DTF unit 401 is supplied with the data signals $Din(M \times v+1)$ to $Din(M \times v+M)$, and performs DFT at M points, thereby generating DFT output signals $Dout(M \times v+1)$ to $Dout(M \times v+M)$. The Z point IDFT partial differential value calculation unit 402 is supplied with, as zero extrapolating DFT output signals $Davin(Z \times v+x)$ (where x is a natural number not greater than Z), Z signal points obtained by extrapolating total (Z−N) zero signal points from outsides of high and low frequency components of the DFT output signals Dout(M×v+1) to Dout(M×v+M), so that a total number of signal points becomes a multiplier of 2. The Z point IDFT partial differential value calculation unit 402 calculates information indicating inclinations of waveforms of data signals after Z/M-times oversampling, from expressions 5 and 6 shown in FIG. 3 which are obtained by performing partial differentiation on each of actual and imaginary components of a calculation expression of IDFT, in relation to time, and outputs the information as an oversampling slope Uov(Z×v+q) (where q is a natural number not greater than Z).

The peak estimation slope approximation unit 403 is supplied with oversampling slope Uov(Z×v+1) to Uov(Z×v+Z), and selects an approximate oversampling slope which is closest to sampling time of each of the data signals Din(M×v+1) to Din(M×v+M), from among the oversampling slopes Uov (Z×v+q). The peak estimation slope approximation unit 403 outputs the selected oversampling slope as a slope estimation value Usl(M×v+i).

Expressions 5 and 6 are obtained by performing partial differentiation on expressions of IDFT at a number of points equal to a multiplier of 2, in relation to time. Therefore, like in the case of reducing a calculation amount of an IDFT calculation by using an IFFT algorithm, the calculation amount can be reduced by using algorithms shown in the expressions 5 and 6.

Where the number of points for IDFT is M, the calculation amount of IDFT is proportional to a square of M. The calculation amount of IFFT is proportional to M log 2 M. Where M is set to 300 in this embodiment, a calculation amount of IDFT at 2M points is 90,000 (300×300). On the other side, since 512 is the least multiplier of 2 which is not smaller than M (=300), the calculation amount is 4,608 in the case of using the algorithm of IFFT. By using the algorithm of IFFT, the calculation amount of calculating a partial differential value of IDFT can be reduced to approximately 1/20 relative to the case of using the algorithm of IFFT.

Figure 8:
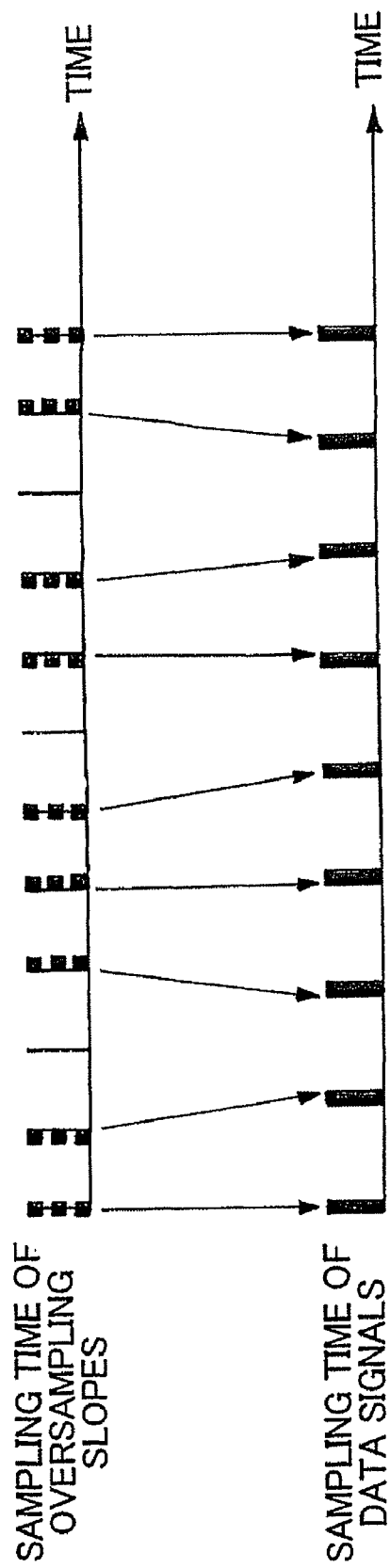
FIG. 8 shows sampling time of an oversampling slope and a data signal.

However, as shown in FIG. 8, a sampling interval for oversampling slopes differs from a sampling interval for data signals but is M/Z of the sampling interval for data signals. Therefore, this embodiment is configured to perform a processing of selecting an oversampling slope which is closest to sampling time of each of the data signals Din(M×v+1) to Din(M×v+M) from among oversampling slopes Uov(Z×v+q), and of outputting the selected oversampling slope as a slope estimation value Usl(M×v+i).

In this embodiment, an oversampling slope which is closest to sampling time of a data signal is used as a slope estimation value. Therefore, effect of more reducing the calculation amount is obtained though effect of reducing PAPR deteriorates to some degree, as compared with the case of accurately calculating an inclination of a data signal at sampling time of the data signal.

Second Embodiment

Figure 9:
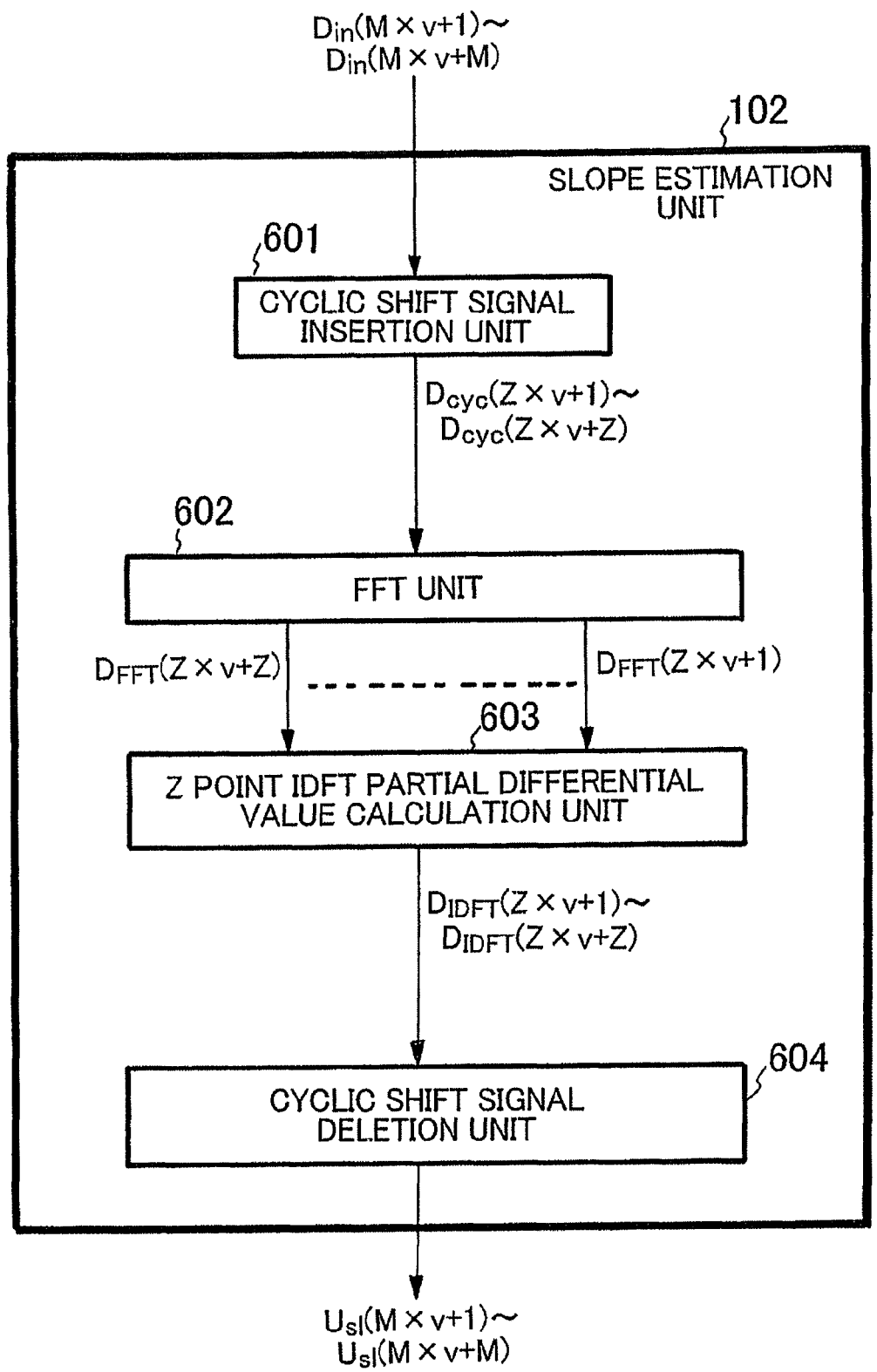
FIG. 9 is a block diagram of a slope estimation unit in a second embodiment.

Next, a second embodiment of the invention will be described. The same block diagram as that of the transmitter in the best mode of the invention can also be referred to as a block diagram of a transmitter in the second embodiment. This embodiment differs from the best mode of the invention in the processing at the slope estimation unit 102. In this embodiment, a slope estimation unit which is the difference from the best mode of the invention will be described with reference to FIGS. 9 and 10. The slope estimation unit 102 shown in FIG. 9 includes a cyclic shift signal insertion unit 601, an FFT unit 602, a Z point IDFT partial differential value calculation unit 603 (where Z is a multiplier of 2 and is greater than N), and a cyclic shift signal deletion unit 604.

The cyclic shift signal insertion unit 601 is supplied with data signals Din(M×v+1) to Din(M×v+M), and inserts data signals Din(M×v+1) to Din(M×v+(Z−M)) corresponding to (Z−M) signals obtained by cyclically shifting data signals, after the last data signal Din(M×v+M) among the data signals Din(M×v+1) to Din(M×v+M). The cyclic shift signal insertion unit 601 outputs results thereof, as cyclic shift insertion signals Dcyc(Z×v+1) to Dcyc(Z×v+Z).

The FFT unit 602 is supplied with cyclic shift insertion signals Dcyc(Z×v+1) to Dcyc(Z×v+Z), performs FFT at Z points, and outputs results thereof as FFT output signals DFFT(Z×v+1) to DFFT(Z×v+Z).

Like in Embodiment 1, the Z point IDFT partial differential value calculation unit 603 is supplied with the FFT output signals DFFT(Z×v+1) to DFFT(Z×v+Z), calculates information indicating inclinations of waveforms of the cyclic shift insertion signals Dcyc(Z×v+1) to Dcyc(Z×v+Z), from expressions which are obtained by performing partial differentiation on each of real and imaginary components of a calculation expression of IDFT, in relation to time, and outputs the information as Z point IDFT partial differential signals DIDFT(Z×v+1) to DIDFT(Z×v+Z).

Figure 10:
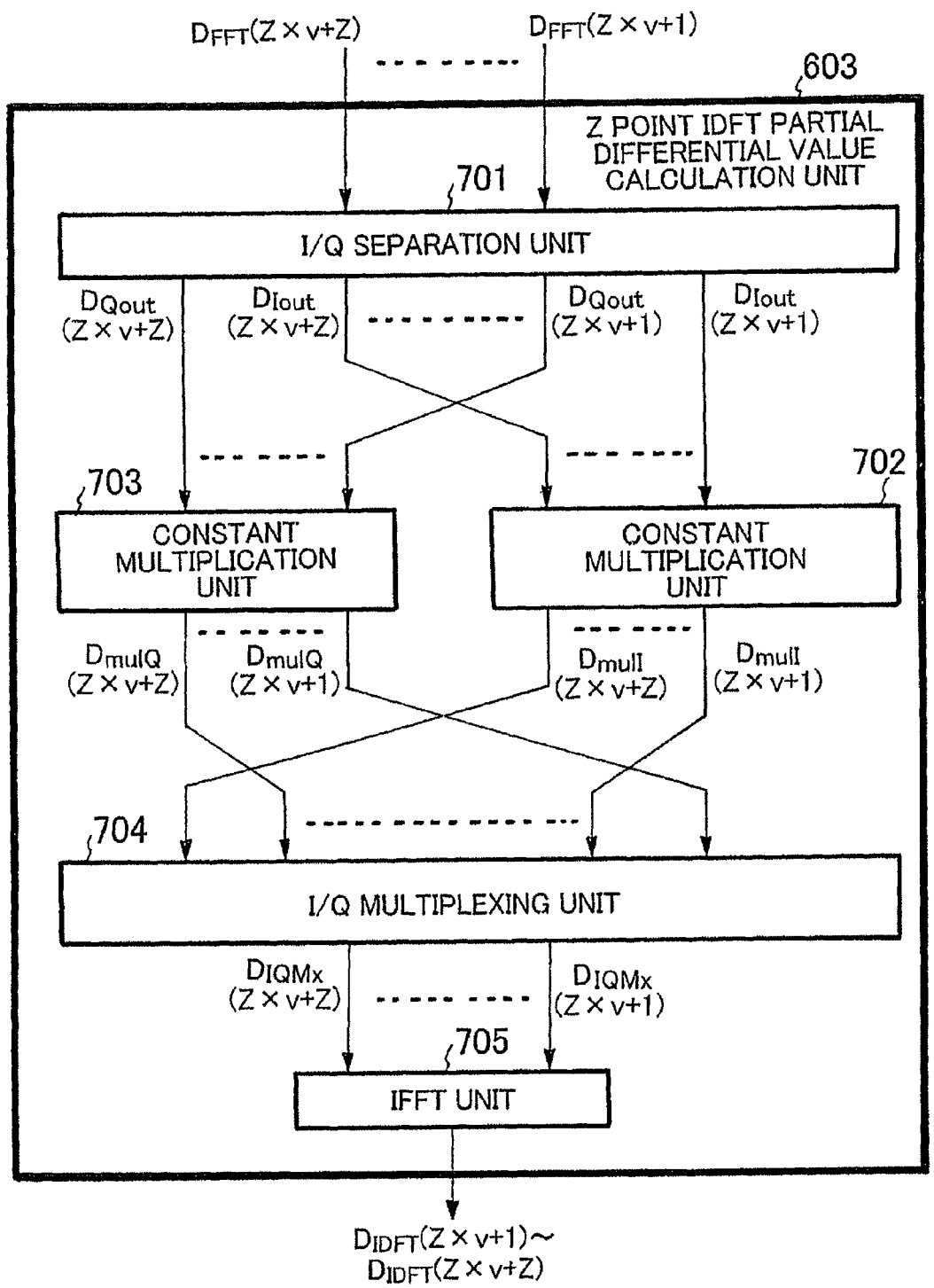
FIG. 10 is a block diagram of a Z point IDFT partial differential value calculation unit in the second embodiment.

Next, an example of using a circuit of IFFT for a processing of the Z point IDFT partial differential value calculation unit will be described with reference to FIG. 10. The Z point IDFT partial differential value calculation unit 603 shown in FIG. 10 includes an I/Q separation unit 701, constant multiplication units 702 and 703, an I/Q multiplexing unit 704, and an IFFT unit 705. The I/Q separation unit 701 is supplied with the FFT output signals DFFT(Z×v+1) to DFFT(Z×v+Z), separates real and imaginary components from each other, and outputs the real and imaginary components as I/Q separation real signals DIout(Z×v+1) to DIout(Z×v+Z) and I/Q separation imaginary signals DQout(Z×v+1) to DQout(Z×v+Z).

The constant multiplication unit 702 is supplied with the I/Q separation real signals DIout(Z×v+1) to DIout(Z×v+Z), multiplies each DIout(Z×v+q) by (2π(q−Z/2)/Z) (where q is a natural number not greater than Z), and outputs results as constant multiplication real signals DmulI(Z×v+1) to DmulI (Z×v+Z). The constant multiplication unit 703 is supplied with the I/Q separation imaginary signals DQout(Z×v+1) to DQout(Z×v+Z), multiplies each DQout(Z×v+q) by (−1×2π (q−Z/2)/Z), and outputs results as constant multiplication imaginary signals DmulQ(Z×v+1) to DmulQ(Z×v+Z).

The I/Q multiplexing unit 704 is supplied with the constant multiplication real signals DmulI(Z×v+1) to DmulI(Z×v+Z) and the constant multiplication imaginary signals DmulQ(Z× v+1) to DmulQ(Z×v+Z), and replaces real and imaginary components with each other, so that the constant multiplication real signals and the constant multiplication imaginary signals become respectively imaginary and real components after I/Q separation. The I/Q multiplexing unit 704 outputs signals thus subjected to I/Q multiplexing, as I/Q multiplex signals DIQMx(Z×v+1) to DIQMx(Z×v+Z).

The IFFT unit 705 is supplied with the I/Q multiplex signals DIQMx(Z×v+1) to DIQMx(Z×v+Z), performs IFFT, and outputs results as Z point IDFT partial differential signal DIDFT(Z×v+1) to DIDFT(Z×v+Z).

The cyclic shift signal deletion unit 604 is supplied with the Z point IDFT partial differential signal DIDFT(Z×v+1) to DIDFT(Z×v+Z), deletes (Z−M) signals corresponding to Z point IDFT partial differential signal DIDFT(Z×v+M+1) to DIDFT(Z×v+Z), and outputs results as slope estimation values Usl(M×v+1) to Usl(M×v+M) for sampling time of the data signals Din(M×v+1) to Din(M×v+M), respectively.

Since the cyclic shift signal insertion unit 601 is used to set the number of signals to a multiplier of 2, an algorithm of FFT can be used in DFT which is used by the slope estimation units in the best mode of the invention and Embodiment 1. Further, since signals cyclically shifted by the cyclic shift signal insertion unit 601 are subjected to FFT by the FFT unit 602, slope calculation accuracy can be prevented from being degraded by performing FFT on discontinuous signals. By using FFT, a calculation amount for DFT in the slope estimation unit can be reduced to approximately $1/20$.

Since the Z point IDFT partial differential value calculation unit performs a processing for multiplying real and imaginary components by a constant and a processing for replacing the real and imaginary components with each other, the circuit for IFFT can be directly used for partial differential calculation in IDFT. Owing to this processing, a calculation amount of partial differential calculation in IDFT can be reduced to approximately $1/20$ compared with a case of not using the algorithm of IFFT. Further, since the circuit for IFFT in the oversampling unit in the transmitter can be directly used, a circuit scale can be prevented from being remarkably increased. If the algorithm of IFFT is used in calculation of partial differential values in DFT and IDFT by the slope estimation unit in the best mode, a calculation amount of the slope estimation unit can be reduced to approximately $1/400$ of that in the best mode.

Third Embodiment

Next, a third embodiment will be described. The same block diagram as that of the transmitter in the best mode of the invention can also be referred to as a block diagram of a transmitter in the third embodiment. This embodiment differs from the best mode of the invention in the setting value for the attenuation coefficient. In this embodiment, only the difference to the best mode of the invention will be described below.

In this embodiment, the attenuation coefficient initial value Y(M×v+h) is changed to the value calculated by the expression 4. In the third embodiment, a fixed value smaller than 1 is used as a value to which the attenuation coefficient initial value Y(M×v+h) is changed. In view of reducing variation of peak power after N/M-times oversampling, the attenuation coefficient initial value Y(M×v+h) should desirably be set to be smaller as amplitude values of data signals and/or slope estimation values are greater. However, insofar as statistical distributions of amplitude values of data signals and/or slope estimation values are known in advance, a most frequently used fixed value may be used as a value to which all attenuation coefficient initial values Y are changed.

In the case of fixing the value to which the attenuation coefficient initial values are changed, variations of amplitudes after N/M-times oversampling are greater as compared with the best mode of the invention in which the attenuation coefficients are set to be smaller as the amplitude values and/or slope estimation values are greater. However, this case results in an effect of reducing a calculation amount as compared with the best mode of the invention.

Figure 11:
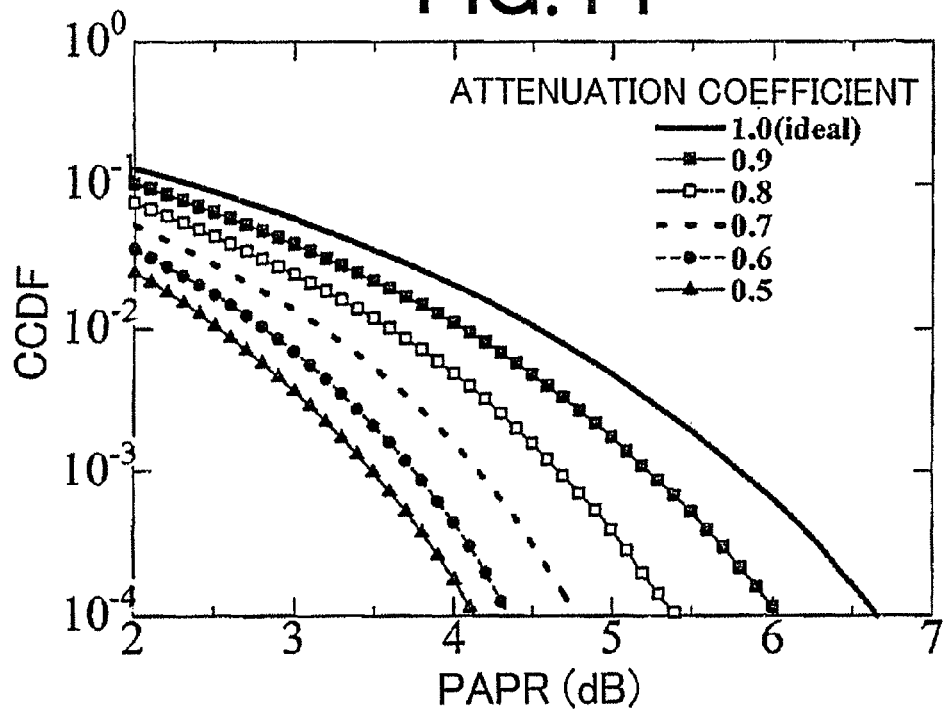
FIG. 11 shows a simulation result of PARA characteristics using Embodiment 3.
Figure 12:
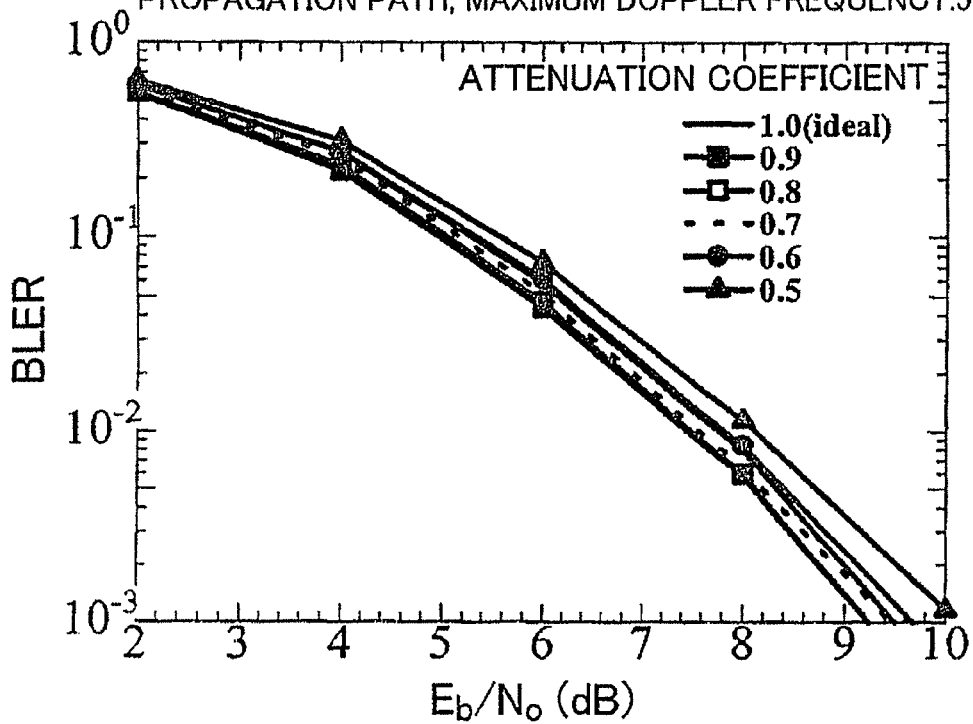
FIG. 12 shows a simulation result of reception characteristics using Embodiment 3.

FIGS. 11 and 12 show results of a simulation according to this embodiment. FIG. 11 shows PARA characteristics, and FIG. 12 shows reception characteristics. By using QPSK modulation, average power was normalized to 1 (e.g., a maximum amplitude of each of real and imaginary components=$\pm 1/\sqrt{2}$). An amplitude threshold A was set to 0.7, and a slope threshold B was set to 1. As the amplitude value was reduced, PAPR decreased. For example, when the attenuation coefficient is set to 0.5, PAPR can be reduced by 2.3 dBor or so for CCDF (Complementary Cumulative Distribution Function)=$10^{-3}$, as compared with a case of not reducing PAPR. However, since a receiver is not notified of information concerning data symbols multiplied by the attenuation coefficient, a required Eb/N0 (a noise to signal power ratio per one bit) as the attenuation coefficient is increased. When the attenuation coefficient is set to 0.5, deterioration of 0.7 dB or so is caused for BLER (Block Error Rate)=$10^{-2}$, as compared with a case of not reducing PAPR. Taken into consideration a deterioration amount of reception characteristics relative to a reduction amount of PAPR, a gain of 1.6 dB or so is obtained by reducing PAPR.

Even by fixing the value to which the attenuation coefficient initial value Y(M×v+h), effect of 1.6 dB or so can be obtained. However, as has been described in the best mode of the invention, the gain obtained by reducing PAPR can be increased further by reducing the attenuation coefficients as the amplitude values of data signals and/or slope estimation values increase.

Fourth Embodiment

Next, a fourth embodiment of the invention will be described. The same block diagram as that of the transmitter in the best mode of the invention can also be referred to as a block diagram of a transmitter in the fourth embodiment. The fourth embodiment is a system which uses a transmitter according to any of the best mode of the invention and first through third embodiments.

In the best mode of the invention and first through third embodiments, calculations such as DFT and FFT are carried out when calculating inclinations of data signals, in order to estimate peaks. If data has a large signal bandwidth, the number of points for DFT and FFT increases, thereby increasing a calculation amount. Meanwhile, if data has a narrow signal bandwidth, the number of points for DFT and FFT decreases, thereby reducing a calculation amount. The larger the signal bandwidth of data is, the heavier a load to a terminal which is caused by reduction of peaks is. Therefore in this embodiment, only when the signal bandwidth of data is narrow, transmission signals are generated reducing peaks.

Attenuation of signal power due to radio wave propagation increases as distance from a base station increases. Therefore, in order to maintain a required reception quality, transmission power needs to be increased as distance from a base station increases. Since maximum transmission power of a base station is limited, there is a case that required transmission power cannot be satisfied when using a broad bandwidth. In this case, for a user who is distant from a base station, power is concentrated on a narrow bandwidth by lowering a transmission rate, to improve a reception quality. If data has a signal bandwidth, a terminal is determined to be distant from a base station, and peak power is lowered so as to increase maximum transmission power which the terminal can transmit. In this manner, reception quality at a cell end can be improved more. Thus, reduction of peaks only when data has a narrow signal bandwidth results in great effect of improvement in reception quality of a user who is distant from a base station.

Fifth Embodiment

Next, a fifth embodiment of the invention will be described. The same block diagram as that of the transmitter in the best mode of the invention can also be referred to as a block diagram of a transmitter in the fifth embodiment. The fifth embodiment is a system which uses a transmitter according to any of the best mode of the invention and first through third embodiments. In the system, a base station measures transmission power which a terminal requires to satisfy reception quality for the base station, on basis of a result of measuring power received from a terminal, and the base station controls transmission power of the terminal. Described below is an example of using a transmitter which reduces PAPR in the system.

Embodiment 4 has described example use of a transmitter which reduces PAPR by associating a signal bandwidth of data with distance from a base station. However, distance from a base station cannot always depend only on a signal bandwidth of data. There can be a case of lowering a transmission rate to transmit a signal of a narrow bandwidth to a user existing in the center of a cell, for whom reception quality is good. If determination is made only based on the narrow band, that is, distance from the base station is long, process of reducing peaks can be wasted.

Hence, in this embodiment, PAPR is reduced to increase maximum transmission power only if required transmission power exceeds maximum transmission power which a terminal can transmit when not reducing PAPR, in the system which performs transmission power control. By utilizing this method, a processing for reducing peaks can be performed for only users who do not satisfy required reception quality. Unnecessary increase of a calculation amount can be prevented by utilizing the method proposed above.

Further, a system which combines Embodiments 4 and 5 and performs transmission power control can increase maximum transmission power by reducing PAPR only if a data transmission bandwidth is narrow and if required transmission power exceeds maximum transmission power which a terminal can transmit when not reducing PAPR.

INDUSTRIAL APPLICABILITY

The present invention is applicable to reduction of peak power in a transmitter using SC-FDMA scheme.

Typical embodiments of the invention have been specifically described above. However, various changes, substitutions, and alternatives to the invention should be understood to be available without deviating from the spirit and scope of the invention specified in appended claims. The present inventor intends that a scope equivalent to that of the claimed invention should be maintained even if any of the claims should be amended in the procedure of the present application for a patent.

The invention claimed is:

1. A signal generation device that generates a transmission signal in a wireless transmission system, characterized by comprising:
   data attenuation coefficient generation means that is supplied with M data signals (M is a natural number), for estimating and selecting data signals that may cause a peak after oversampling, determining an attenuation amount for the selected one or more data signals, generating information concerning a selection result and the determined attenuation amount for the selection result, and outputting the information as a data attenuation coefficient;
   an attenuation coefficient multiplication unit that is supplied with the M data signals and the data attenuation coefficient, multiplies each of the data signals corresponding to the selection result for the data attenuation coefficient by the attenuation amount for the selection result, and outputs multiplication results as M attenuation coefficient multiplication signals; and
   an oversampling unit that is supplied with the M attenuation coefficient multiplication signals and performs oversampling, thereby generating and outputting a transmission signal, wherein
   the data attenuation coefficient generation means includes
   a slope estimation unit that outputs, as slope estimation values corresponding respectively to the M data signals, information indicating inclinations of data signal waveforms at data signal points, from the M data signals, respectively, and
   a slope reference attenuation signal selection unit that is supplied with the M data signals and the M slope estimation values, estimates and selects data signals that may cause a peak after oversampling, based on amplitude values of the M data signals and the M slope estimation values, determines an attenuation amount for the selected data signals, generates information concerning a selection result and the determined attenuation amount, and outputs the information as the data attenuation coefficient.

2. The signal generation device according to claim 1, characterized in that
   the slope reference attenuation signal selection unit is supplied with first to $M^{th}$ data signals and first to $M^{th}$ slope estimation values in a unit time slot, and
   for $j^{th}$ to $(j+p)^{th}$ data signals (where j is a natural number not greater than (M−1)) among the first to $M^{th}$ data signals where the $j^{th}$ to $(j+p)^{th}$ data signals have an amplitude value not smaller than an amplitude threshold A or not greater than an amplitude threshold −A (where A is a positive real number) and that are continuous through (p+1) points (where p is a natural number not greater than (M−1)), if two conditions are both satisfied, a first one of which being a condition that a slope threshold B (where B is a positive real number) is exceeded by magnitudes of $j^{th}$ to $(j+p-1)^{th}$ slope estimation values corresponding to $j^{th}$ to $(j+p-1)^{th}$ data signals excluding a $(j+p)^{th}$ data signal (where j is a natural number not greater than (M−1)), and a second one of which being a condition that a sign of a $k^{th}$ data signal (where k is an integer between j and (j+p−1)) is the same as a sign of a $k^{th}$ slope estimation value, then at least one of the $k^{th}$ data signal and a $(k+1)^{th}$ data signal is selected, an attenuation amount for the selected at least one data signal is determined, and information concerning a selection result and the determined attenuation amount are generated and output as the data attenuation coefficient.

3. The signal generation device according to claim 2, characterized in that selection of the data signal is carried out independently for real and imaginary components, an attenuation amount is determined for the data signal selected by at least one of the real and imaginary components, and information concerning a selection result and the determined attenuation amount is generated and output as the data attenuation coefficient.

4. The signal generation device according to claim 2, characterized in that selection of the data signal is carried out independently for real and imaginary components, an attenuation amount is determined for only the data signal selected by both of the real and imaginary components, and information concerning a selection result and the determined attenuation amount is generated and output as the data attenuation coefficient.

5. The signal generation device according to claim 2, characterized in that selection of the data signal is carried out independently for real and imaginary components, attenuation amounts are independently determined respectively for the real and imaginary components of the data signal corresponding to a selection result, and information concerning the selection result and the determined attenuation amounts are generated and output as the data attenuation coefficient.

6. The signal generation device according to claim 1, characterized in that
the slope reference attenuation signal selection unit is supplied with first to $M^{th}$ data signals and first to $M^{th}$ slope estimation values in a unit time slot, and
a data signal for which a magnitude of a slope estimation value exceeds a slope threshold B (where B is a positive real number) is selected, an attenuation amount is determined for the selected data signal, information concerning a selection result and the determined attenuation amount is generated and output as the data attenuation coefficient.

7. The signal generation device according to claim 1, characterized in that
the slope reference attenuation signal selection unit is supplied with first to $M^{th}$ data signals and first to $M^{th}$ slope estimation values in a unit time slot,
a data signal for which a magnitude of a slope estimation value exceeds a slope threshold B (where B is a positive real number) is selected, an attenuation amount is determined for the selected data signal,
for $j^{th}$ to $(j+p)^{th}$ data signals (where j is a natural number not greater than (M−1)) among the first to $M^{th}$ data signals excluding the selected data signal where the $j^{th}$ to $(j+p)^{th}$ data signals have an amplitude value not smaller than an amplitude threshold A or not greater than an amplitude threshold −A (where A is a positive real number) and that are continuous through (p+1) points (where p is a natural number not greater than (M−1)), if two conditions are both satisfied, a first one of which being a condition that a slope threshold C (where C is a positive real number) is exceeded by magnitudes of $j^{th}$ to $(j+p-1)^{th}$ slope estimation values corresponding to $j_{th}$ to $(j+p-1)^{th}$ data signals excluding a $(j+p)^{th}$ data signal (where j is a natural number not greater than (M−1)), and a second one of which being a condition that a sign of a $k^{th}$ data signal (where k is an integer between j and (j+p−1)) is the same as a sign of a $k^{th}$ slope estimation value, then at least one of the $k^{th}$ data signal and a $(k+1)^{th}$ data signal is selected, an attenuation amount for the selected at least one data signal is determined, and information concerning a selection result and the determined attenuation amount are generated and output as the data attenuation coefficient.

8. The signal generation device according to claim 1, characterized in that, in a processing executed by the slope reference attenuation signal selection unit for generating the data attenuation coefficient,
at least one of the amplitude value of each of the data signals and the slope estimation value is used, and a value of the attenuation amount indicated by the data attenuation coefficient is set so as to decrease as the slope estimation value or the amplitude value of each of the data signals increases.

9. The signal generation device according to claim 1, characterized in that, in a processing executed by the slope reference attenuation signal selection unit for generating the data attenuation coefficient,
a value of the attenuation amount indicated by the data attenuation coefficient is a fixed value.

10. The signal generation device according to claim 1, characterized in that
the slope estimation unit is supplied with first to $M^{th}$ data signals in a unit time slot,
the slope estimation unit outputs, as P cyclic shift insertion data signals, P signals obtained by inserting the first to $(P-M)^{th}$ data signals respectively at ends of the first to $M^{th}$ data signals (where P is a multiplier of 2, which is greater than M and is not greater than 2M),
the slope estimation unit takes, as P DFT conversion output signals, signals obtained by performing DFT at P points on the P cyclic shift insertion data signals,
the slope estimation unit calculates, from the P DFT conversion output signals, information indicating inclinations of waveforms of the data signals as P cyclic shift insertion slope signals, and
the slope estimation unit deletes $(M+1)^{th}$ to $P^{th}$ cyclic shift insertion slope signals from the first to $P^{th}$ cyclic shift insertion slope signals, thereby to output the first to $M^{th}$ slope estimation values corresponding respectively to the first to $M^{th}$ data signals.

11. The signal generation device according to claim 1, characterized in that
the slope estimation unit is supplied with first to $M^{th}$ data signals in a unit time slot,
the slope estimation unit outputs, as Q zero insertion data signals, Q signals obtained by inserting zero signals respectively at ends of the first to M-th data signals (where Q is a multiplier of 2, which is greater than M),
the slope estimation unit takes, as Q DFT conversion output signals, signals obtained by performing DFT at Q points on the Q zero insertion data signals,
the slope estimation unit calculates, from the Q DFT conversion output signals, information indicating inclinations of waveforms of the data signals as Q zero insertion slope signals, and
the slope estimation unit deletes $(M+1)^{th}$ to $Q^{th}$ zero insertion slope signals from the first to $Q^{th}$ zero insertion slope signals, thereby to output the first to $M^{th}$ slope estimation values corresponding respectively to the first to $M^{th}$ data signals.

12. The signal generation device according to claim 1, characterized in that
the slope estimation unit is supplied with first to $M^{th}$ data signals in a unit time slot,
the slope estimation unit takes, as first to $M^{th}$ DFT output signals, signals obtained by performing DFT at M points,
the slope estimation unit takes, as Z zero exertion DFT output signals, Z signal points obtained by exerting total (Z−M) zero signals from outside high and low frequency components of the first to $M^{th}$ DFT output signals (where Z is a multiplier of 2, which is greater than M),
the slope estimation unit calculates, from the Z zero exertion DFT output signals, information indicating inclinations of waveforms of the data signal after Z/M-times oversampling, corresponding to sampling time, and
the slope estimation unit outputs as the first to $M^{th}$ slope estimation values, oversampling slopes among the Z oversampling slopes that are closest to the sampling time of the first to $M^{th}$ data signals, respectively.

13. A wireless transmission system that generates a transmission signal with peak power reduced by using a signal generation device according to claim 1 only in a case that a signal is transmitted within a bandwidth with which a calculation amount of the data attenuation coefficient calculation means is not greater than a predetermined value.

14. A wireless transmission system that generates a transmission signal with peak power reduced by using a signal generation device according to claim 1 only in a case that required transmission power exceeds maximum transmission power which a terminal can transmit when the peak power is not reduced.

15. A wireless transmission system that generates a transmission signal with peak power reduced by using a signal generation device according to claim 1, if a signal is transmitted within a bandwidth with which a calculation amount of the data attenuation coefficient calculation means is not greater than a predetermined value, and if required transmission power exceeds maximum transmission power which a terminal can transmit when the peak power is not reduced.

16. A signal generation method for generating a transmission signal in a wireless transmission system, characterized by comprising:
   a data attenuation coefficient generation step, that is supplied with M data signals (M is a natural number), of estimating and selecting data signals that may cause a peak after oversampling, determining an attenuation amount for the selected one or more data signals, generating information concerning a selection result and the determined attenuation amount for the selection result, and outputting the information as a data attenuation coefficient;
   an attenuation coefficient multiplication step, that is supplied with the M data signals and the data attenuation coefficient, of multiplying each of the data signals corresponding to the selection result for the data attenuation coefficient by the attenuation amount for the selection result, and outputting multiplication results as M attenuation coefficient multiplication signals; and
   an oversampling step, that is supplied with the M attenuation coefficient multiplication signals, of performing oversampling, thereby to generate and output a transmission signal, characterized in that
   the data attenuation coefficient generation step includes
   a slope estimation step of outputting, as slope estimation values corresponding respectively to the M data signals, information indicating inclinations of data signal waveforms at data signal points, from the M data signals, respectively, and
   a slope reference attenuation signal selection step, that is supplied with the M data signals and the M slope estimation values, of estimating and selecting data signals that may cause a peak after oversampling, based on amplitude values of the M data signals and the M slope estimation values, determining an attenuation amount for the selected data signals, generates information concerning a selection result and the determined attenuation amount, and outputting the information as the data attenuation coefficient.

17. A non-transitory computer readable medium, on which a program is recorded, said program causing a transmission device to perform signal generation process to generate a transmission signal in a wireless transmission system, characterized by comprising:
   data attenuation coefficient generation process that is supplied with M data signals (M is a natural number), estimates and selects data signals that may cause a peak after oversampling, determines an attenuation amount for the selected one or more data signals, generates information concerning a selection result and the determined attenuation amount for the selection result, and outputs the information as a data attenuation coefficient;
   attenuation coefficient multiplication process that is supplied with the M data signals and the data attenuation coefficient, multiplies each of the data signals corresponding to the selection result for the data attenuation coefficient by the attenuation amount for the selection result, and outputs multiplication results as M attenuation coefficient multiplication signals; and
   oversampling process that is supplied with the M attenuation coefficient multiplication signals and performs oversampling, thereby to generate and output a transmission signal, characterized in that
   the data attenuation coefficient generation process includes
   slope estimation process that outputs, as slope estimation values corresponding respectively to the M data signals, information indicating inclinations of data signal waveforms at data signal points, from the M data signals, respectively, and
   slope reference attenuation signal selection process that is supplied with the M data signals and the M slope estimation values, estimates and selects data signals that may cause a peak after oversampling, based on amplitude values of the M data signals and the M slope estimation values, determines an attenuation amount for the selected data signals, generates information concerning a selection result and the determined attenuation amount, and outputs the information as the data attenuation coefficient.

* * * * *

UNITED STATES PATENT AND TRADEMARK OFFICE
CERTIFICATE OF CORRECTION

PATENT NO. : 8,218,521 B2  
APPLICATION NO. : 12/445683  
DATED : July 10, 2012  
INVENTOR(S) : Kenji Koyanagi Page 1 of 1

It is certified that error appears in the above-identified patent and that said Letters Patent is hereby corrected as shown below:

In the Specifications

Column 2, Line 8: delete "with" and insert -- vth --

Column 3, Line 15: delete "IFFt" and insert -- IFFT --

Column 6, Line 67: Delete "Davin" and insert -- Dovin --

In the Claims

Column 13, Line 40: In Claim 7, delete "$j_{th}$" and insert -- $j^{th}$ --

Column 14, Line 28: In Claim 11, delete "M-th" and insert -- $M^{th}$ --

Signed and Sealed this  
Fourteenth Day of May, 2013

Teresa Stanek Rea  
*Acting Director of the United States Patent and Trademark Office*